(No Model.)
A. M. ELLINGTON.
PLOW FENDER.
No. 489,941. Patented Jan. 17, 1893.
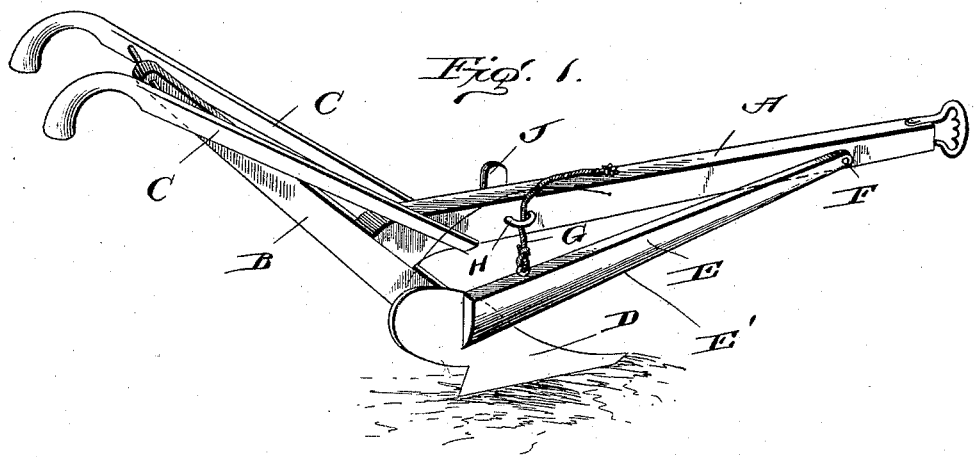
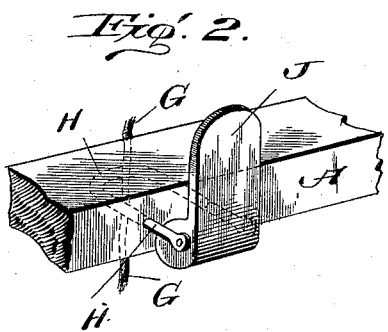
Witnesses
Alvey M. Ellington,
Inventor
By
Attorney

UNITED STATES PATENT OFFICE.

ALVEY MARCELLOUS ELLINGTON, OF ALMIRA, ASSIGNOR OF ONE-HALF TO T. N. WESTBROOK, OF ATLANTA, TEXAS.

PLOW-FENDER.

SPECIFICATION forming part of Letters Patent No. 489,941, dated January 17, 1893.

Application filed September 10, 1892. Serial No. 445,482. (No model.)

*To all whom it may concern:*

Be it known that I, ALVEY MARCELLOUS ELLINGTON, a citizen of the United States, residing at Almira, in the county of Cass and State of Texas, have invented certain new and useful Improvements in Plow-Fenders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in plow fenders, and the leading object of my invention is the provision of a fender which will be especially adapted for use where young and tender plants are being cultivated, that is a fender which will lightly bear against the plants and move them out of the path of the plow point without danger of injury to said plants.

Another object of my invention is the provision of a fender which can be easily applied to an ordinary or common plow at a very small price, which will be adjustable according to the growth of the plants and will be very light in weight and easily moved or elevated, and which will be durable.

To attain the desired objects my invention consists of a fender embodying certain novel features of construction and adaptation for service as will be understood from the drawings and description.

Figure 1 represents a perspective view of a plow with my fender applied, and Fig. 2 represents a similar view from the opposite side of the plow.

Referring by letters to the drawings—A designates the plow beam; B designates the standard; C designates the handles; and D designates the plow point all of which features are of well known or any other construction with which my fender may be employed.

My improved fender consists of a bar or strip E, which is preferably tapering from the pivoted end F to the free end which causes the fender to ride gradually against the plants and gently move them out of the way of the point, and the engaging edge E' of the fender is rounding so as not to cut the plants.

To the inner or free end of the fender is attached a cord or flexible strap G, the upper end whereof is engaged and retained at any point by the laterally movable staple H, which passes through the plow beam and has the cam lever J, which bears against the beam to hold the staple tight against the cord and retain the same in the adjusted position, as will be apparent.

It will thus be seen that the fender is very light and sensitive so that when it comes in contact with the plants it will gradually and gently move them out of the way of the point and not injure the plants in the least which is a great advantage over most fenders which are heavy and rigid. It will also be seen that the device is of the simplest possible construction and cannot get out of order; is thoroughly efficient; is adjustable to the growth of the plants; and can be produced at a very small price thus possessing all the requirements to render the device practical and useful.

I claim as my invention;

1. The combination with a plow beam, of the flat strip having the narrow front end pivoted to the beam and gradually tapered outward to the inner end and having the lower rounding edge, the cord or flexible connection between the inner end of strip and beam, the staple for securing the cord, and the cam operating the staple.

2. The combination with a plow, of the fender herein described, consisting of the strip pivoted at its front or outer end to the plow beam having its inner end adjacent to the plow point, the cord or flexible connection between the inner end of strip and beam, and the staple having the cam lever for causing the staple to impinge against the connection and sustain the fender at any adjustment, substantially as described.

In testimony whereof I affix my signature in presence of two witnesses.

ALVEY MARCELLOUS ELLINGTON.

Witnesses:
W. H. ELLINGTON, Sr.,
Z. H. WILSON.